US012695175B2

(12) United States Patent
Noh et al.

(10) Patent No.: US 12,695,175 B2
(45) Date of Patent: Jul. 28, 2026

(54) PORTABLE TERMINAL SUPPORTING SHORT-RANGE COMMUNICATION FROM TOP AND BACK

(71) Applicant: AMOTECH CO., LTD., Incheon (KR)

(72) Inventors: Jinwon Noh, Incheon (KR); Jooseung Maeng, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 35 days.

(21) Appl. No.: 18/875,125

(22) PCT Filed: Jun. 13, 2023

(86) PCT No.: PCT/KR2023/008090
§ 371 (c)(1),
(2) Date: Dec. 14, 2024

(87) PCT Pub. No.: WO2023/243980
PCT Pub. Date: Dec. 21, 2023

(65) Prior Publication Data

US 2025/0364715 A1 Nov. 27, 2025

(30) Foreign Application Priority Data

Jun. 15, 2022 (KR) ........................ 10-2022-0072502

(51) Int. Cl.
*H01Q 1/24* (2006.01)
*H01Q 7/00* (2006.01)

(52) U.S. Cl.
CPC ............... *H01Q 1/243* (2013.01); *H01Q 7/00* (2013.01)

(58) Field of Classification Search
CPC . H01Q 1/243; H01Q 7/00; H04B 5/26; H04B 5/43
See application file for complete search history.

(56) References Cited

U.S. PATENT DOCUMENTS 9,325,080 B2 4/2016 Ouyang et al.
9,905,925 B2 2/2018 Lee et al.
(Continued)

FOREIGN PATENT DOCUMENTS

KR 10-2014-0134238 A 11/2014
KR 10-2014-0136789 A 12/2014
(Continued)

OTHER PUBLICATIONS

KR Office Action dated May 24, 2024 as received in Application No. 10-2022-0072502.
(Continued)

*Primary Examiner* — Daniel Munoz
(74) *Attorney, Agent, or Firm* — Maschoff Brennan

(57) ABSTRACT

The present disclosure presents a portable terminal which has antennas connected to first and second transmission ends of an NFC chipset, respectively, to enable short-range communication from the top and the back of the portable terminal. The presented portable terminal comprises: the NFC chipset having the first transmission end and the second transmission end; a first antenna connected to the first transmission end and having a region disposed parallel to the top of the portable terminal; and a second antenna connected to the second transmission end and having a loop disposed parallel to the back of the portable terminal.

12 Claims, 13 Drawing Sheets

(56) References Cited

U.S. PATENT DOCUMENTS

| | | | | |
|---|---|---|---|---|
| 10,200,092 | B1 | 2/2019 | Irci et al. | |
| 10,256,526 | B2 | 4/2019 | Lee et al. | |
| 10,651,897 | B2 | 5/2020 | Lee et al. | |
| 11,088,436 | B2 | 8/2021 | Noh et al. | |
| 2016/0380337 | A1* | 12/2016 | Lee | H01Q 21/28 343/702 |
| 2022/0115778 | A1* | 4/2022 | Li | H01Q 5/335 |

FOREIGN PATENT DOCUMENTS

| | | | |
|---|---|---|---|
| KR | 10-1619322 | B1 | 5/2016 |
| KR | 10-2016-0122615 | A | 10/2016 |
| KR | 10-2017-0001978 | A | 1/2017 |
| KR | 10-2019-0037100 | A | 4/2019 |

OTHER PUBLICATIONS

KR Decision to Grant Dated Oct. 24, 2024 as received in Application No. 10-2022-0072502.

* cited by examiner

[FIG. 1]
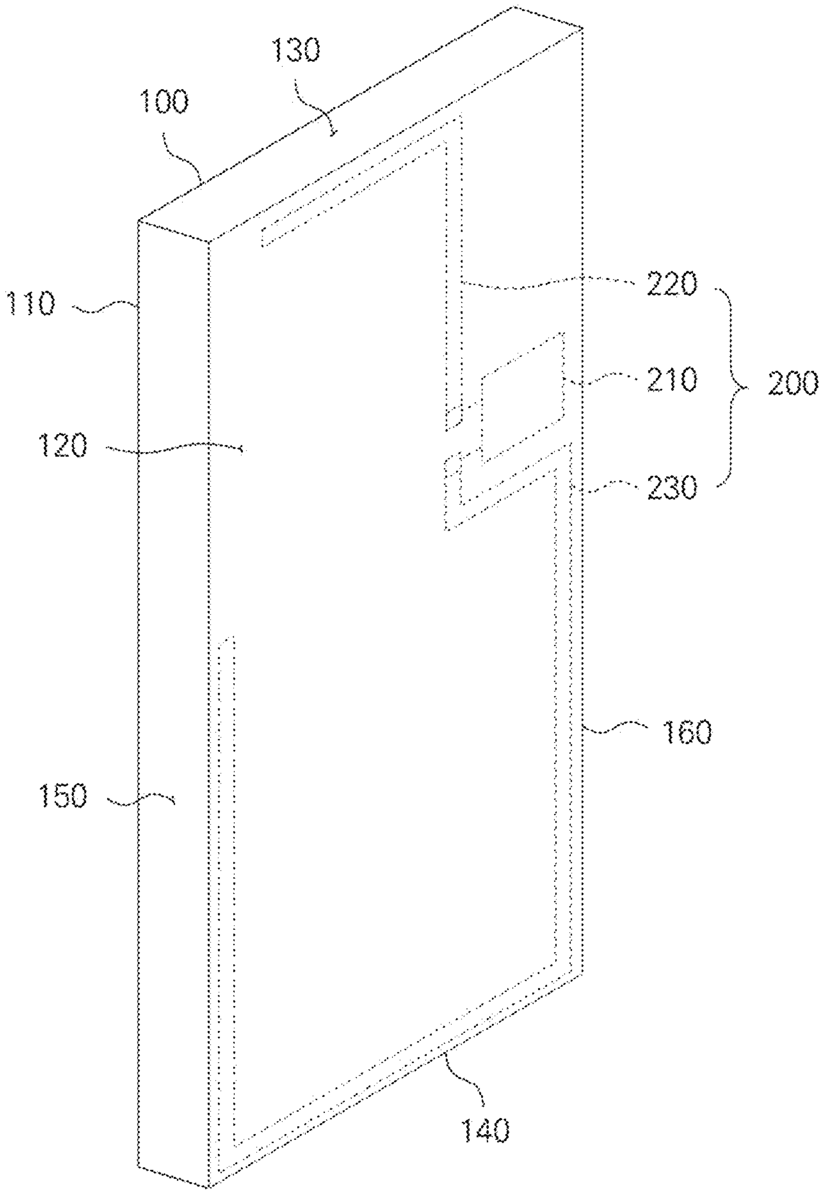

[FIG. 2]
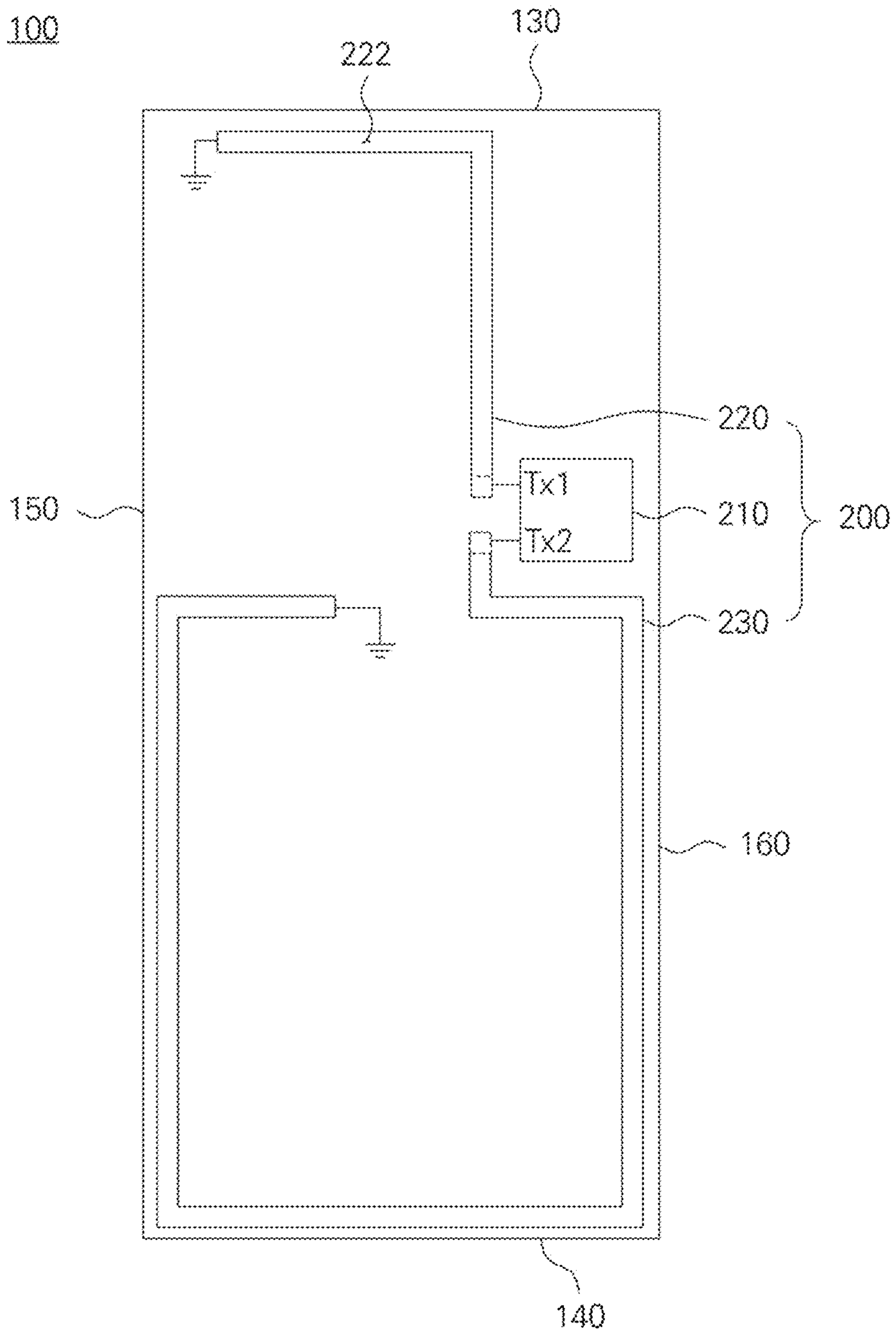

[FIG. 3]
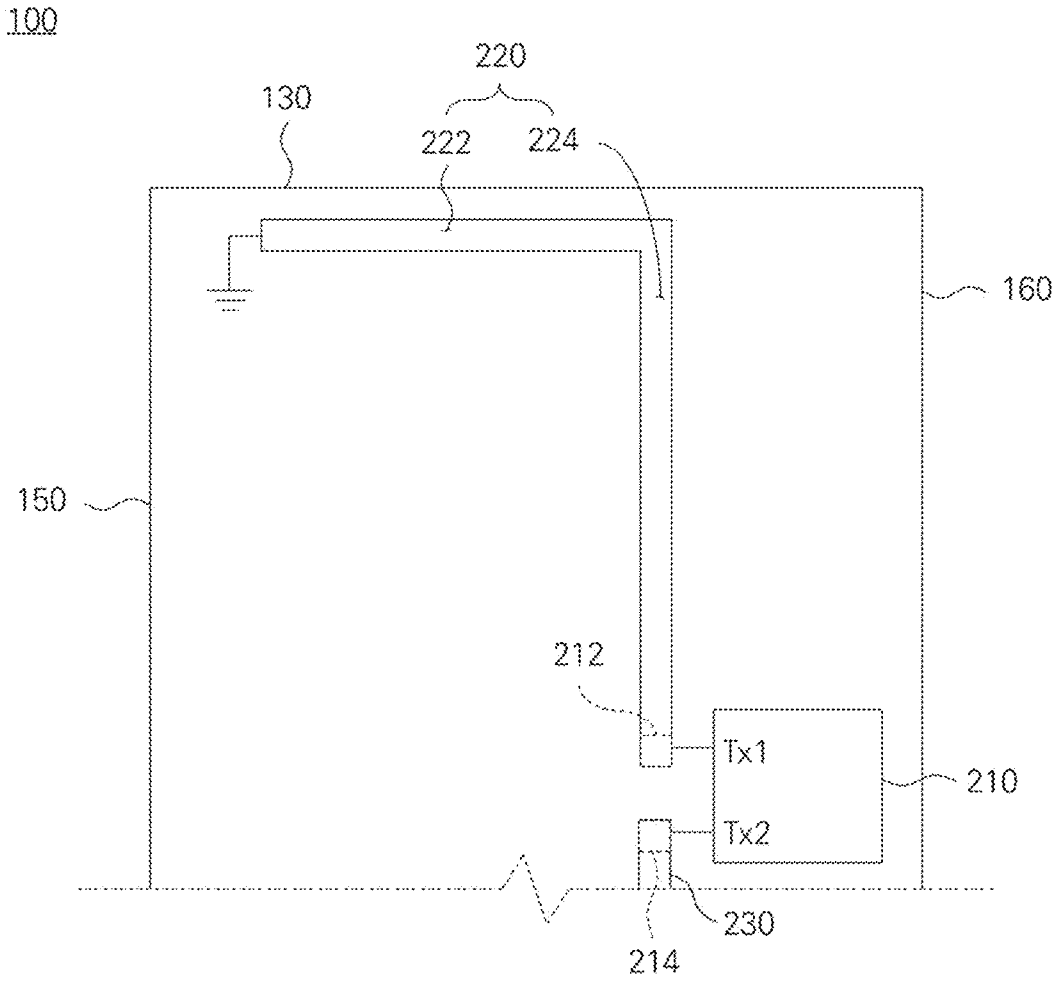

[FIG. 4]
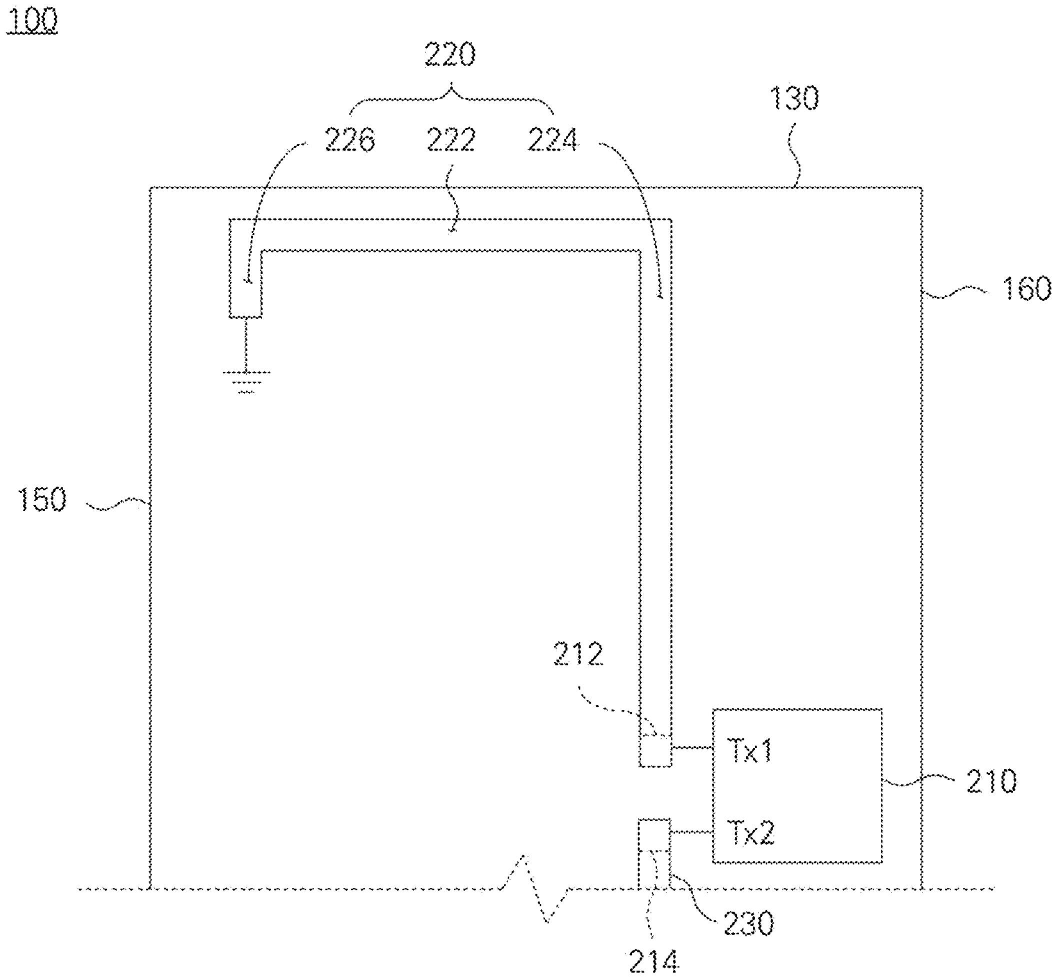

[FIG. 5]
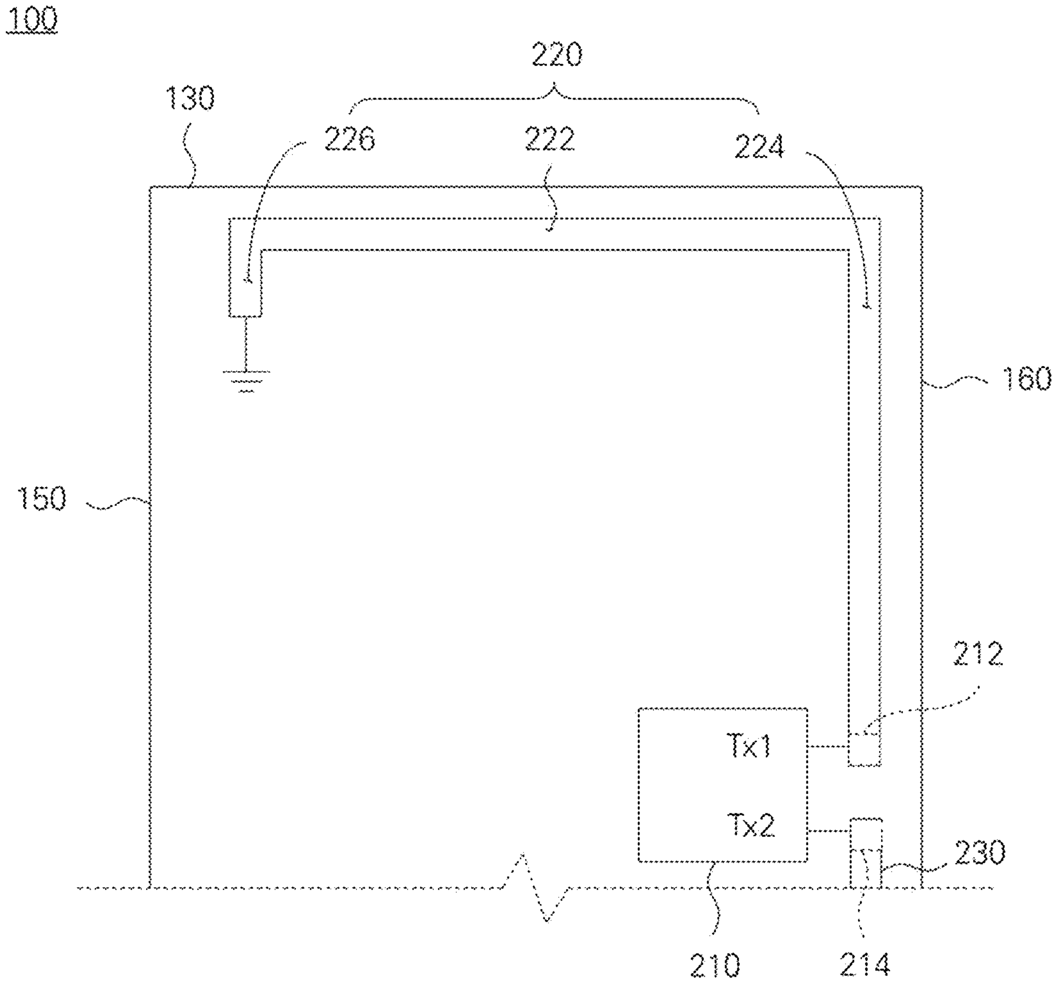

[FIG. 6]
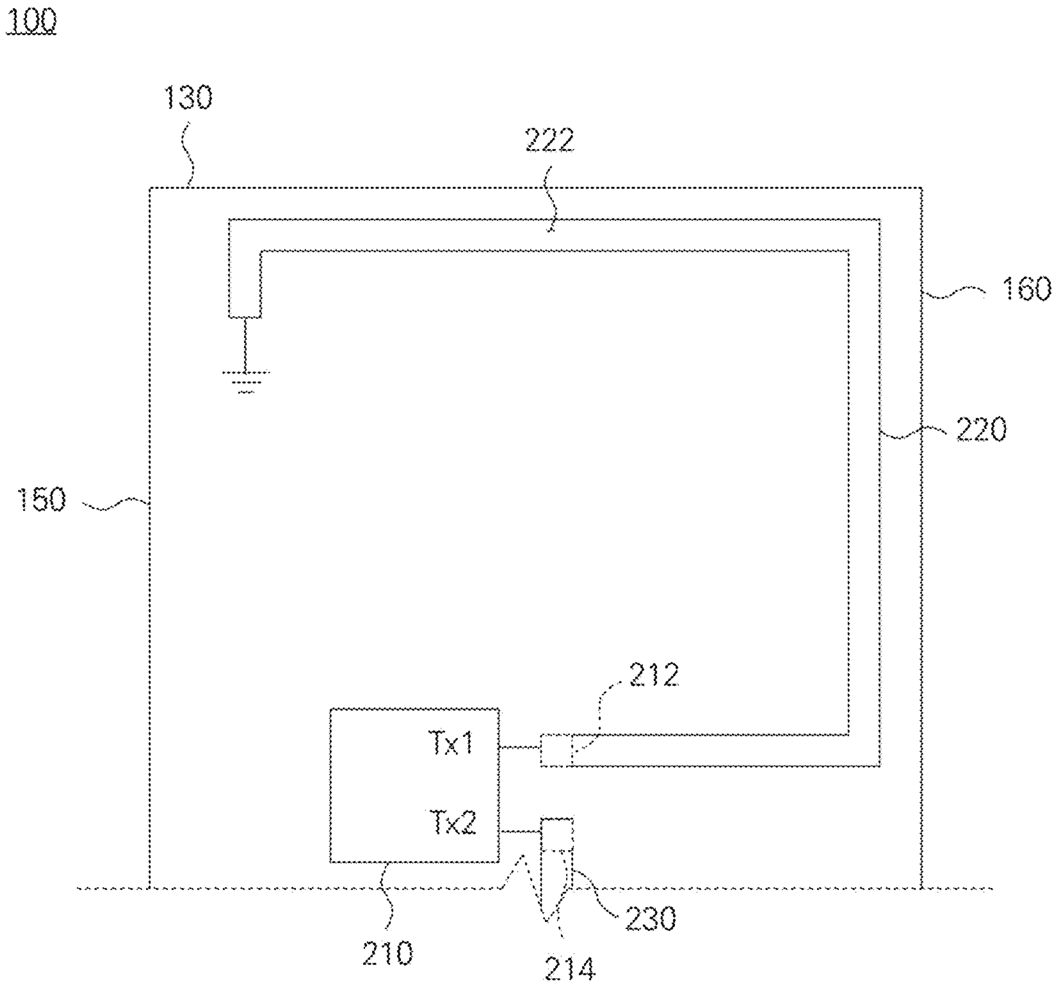

[FIG. 7]
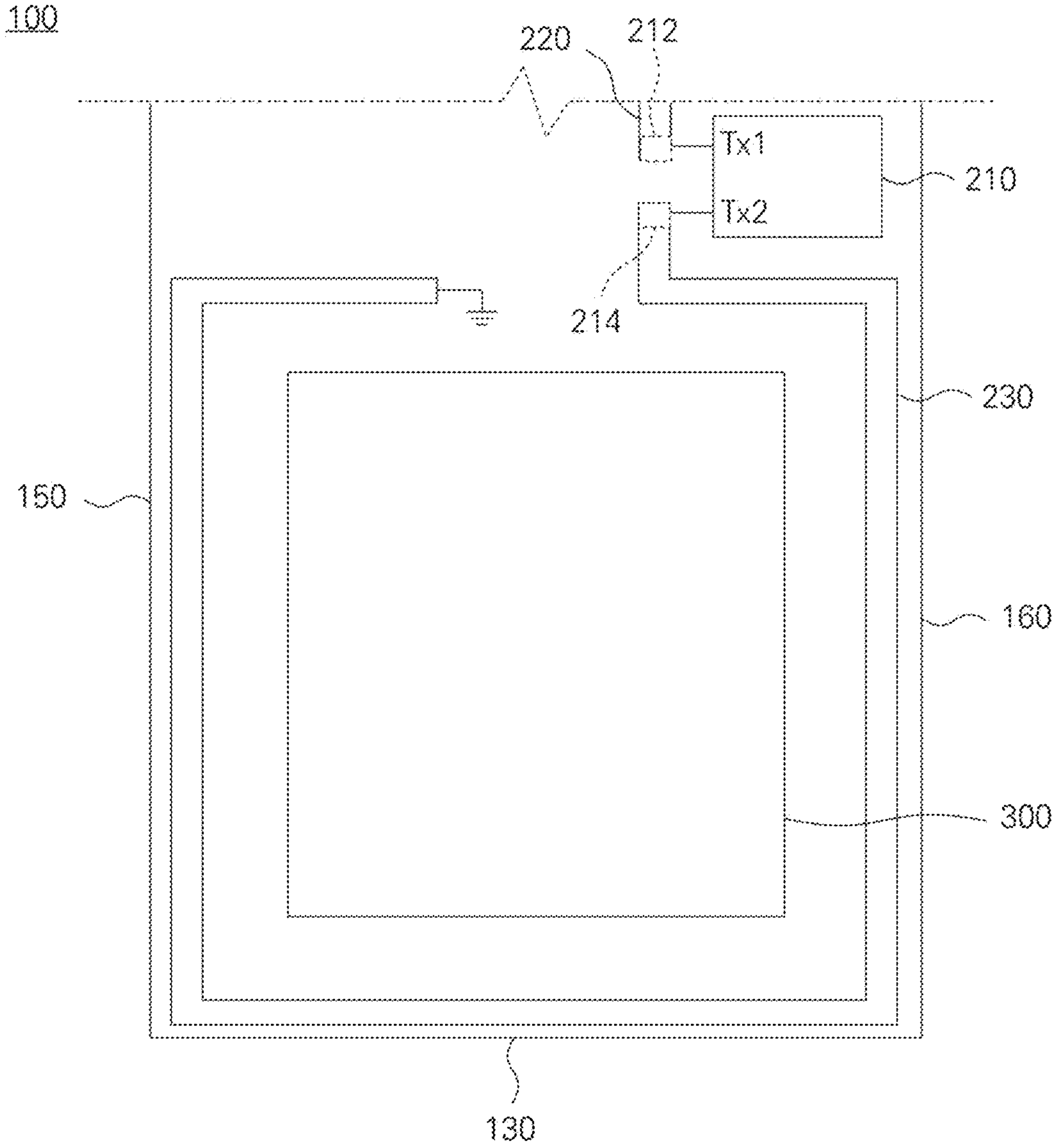

[FIG. 8]
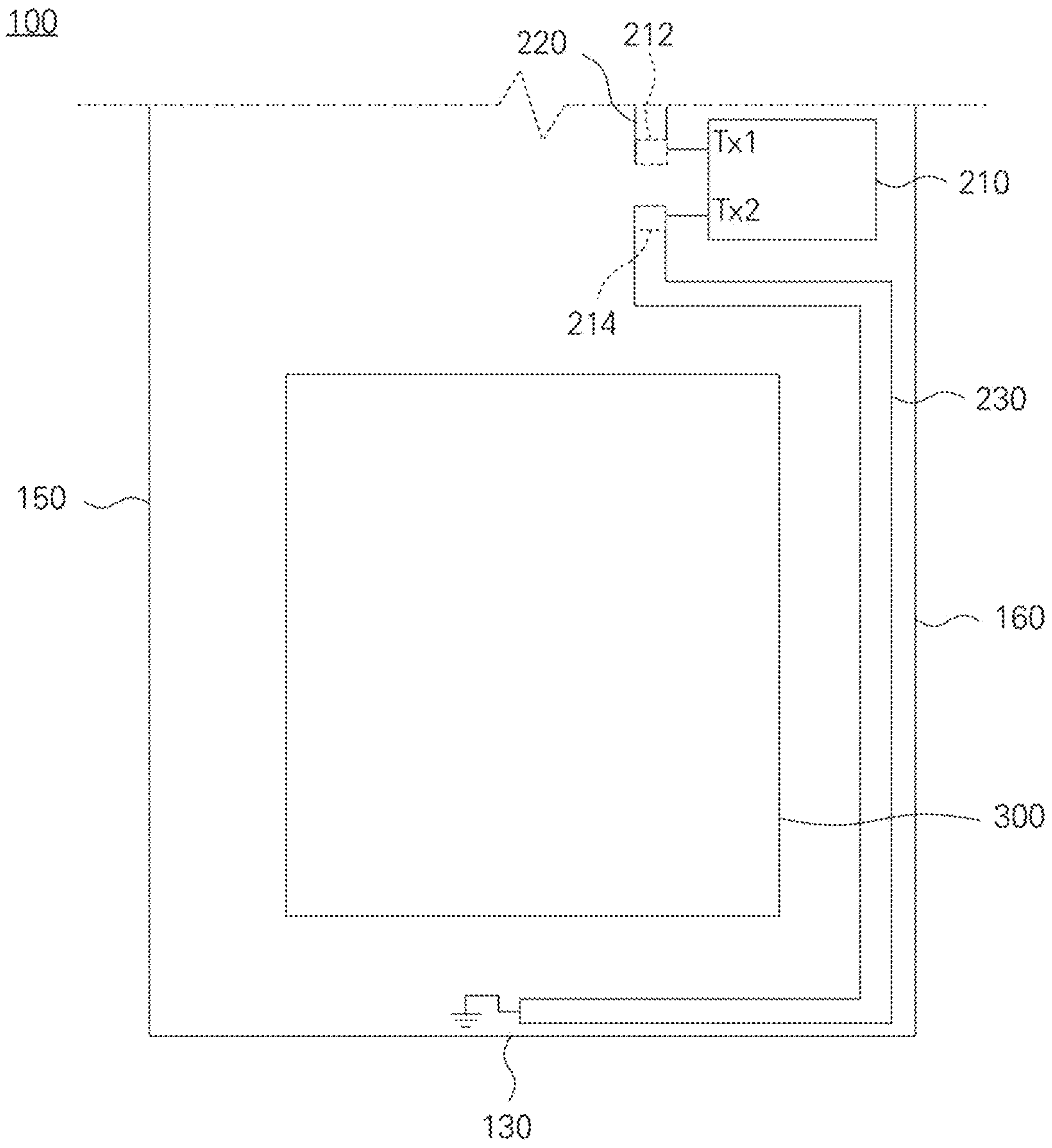

[FIG. 9]
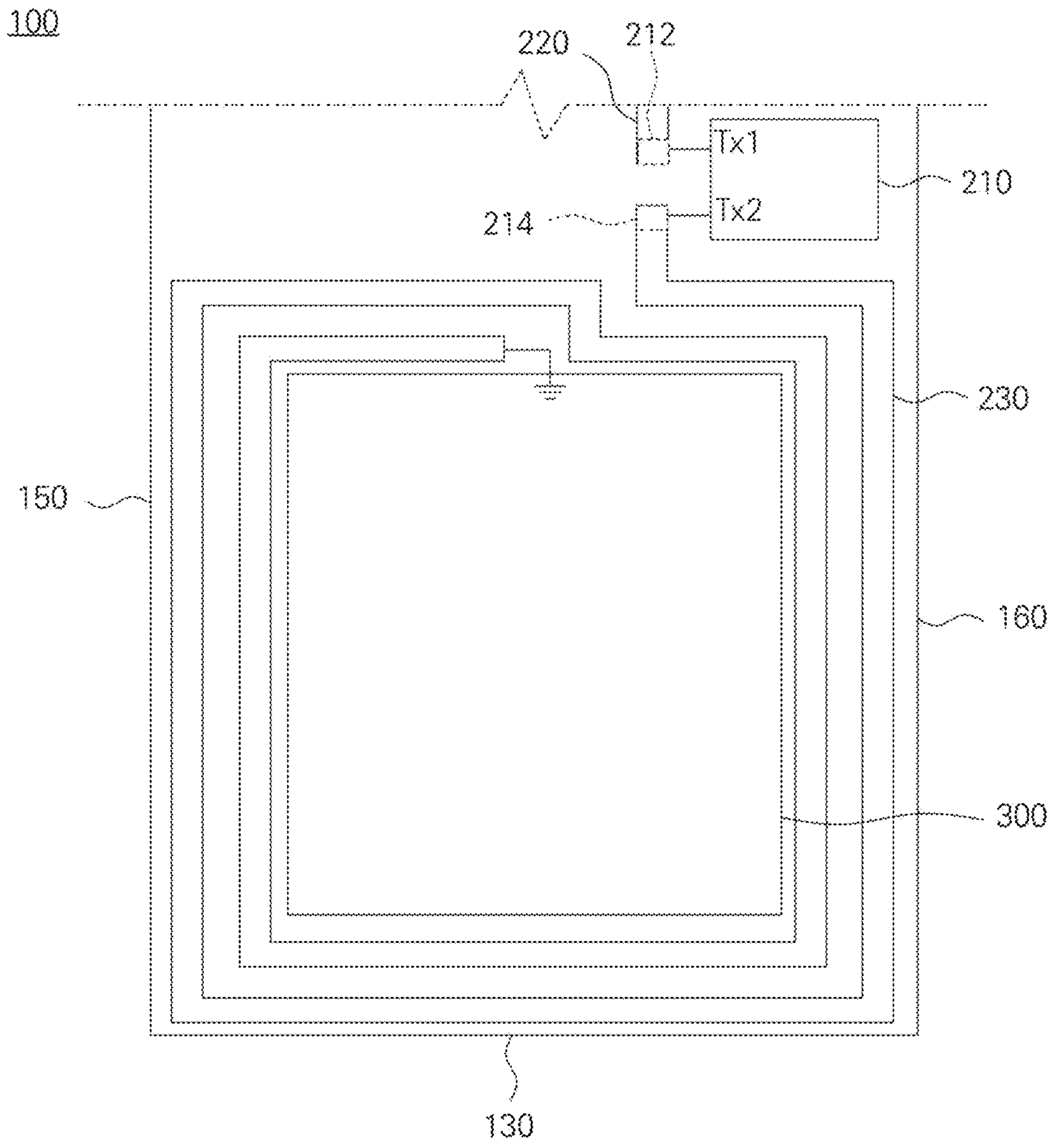

[FIG. 10]
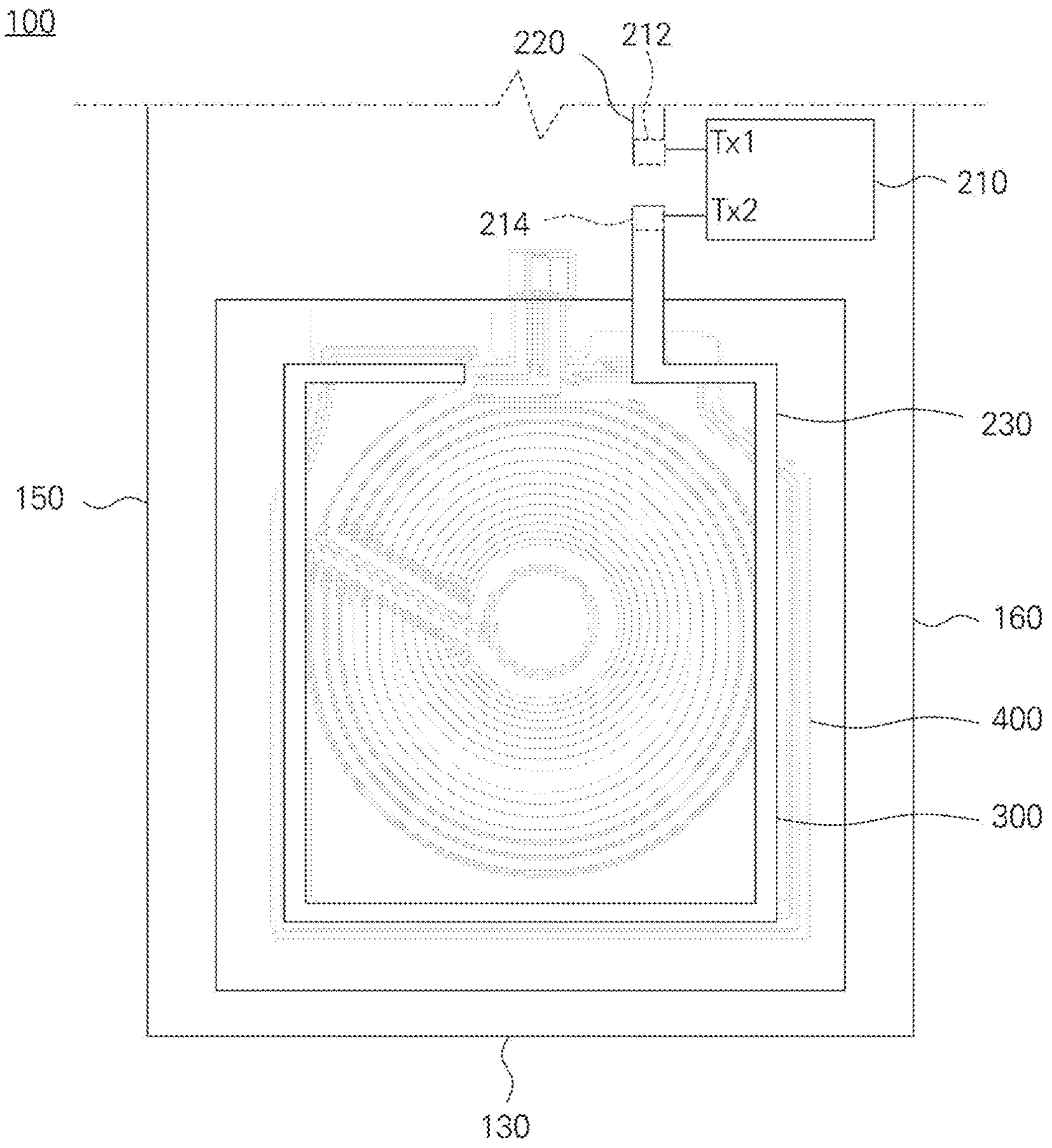

[FIG. 11]
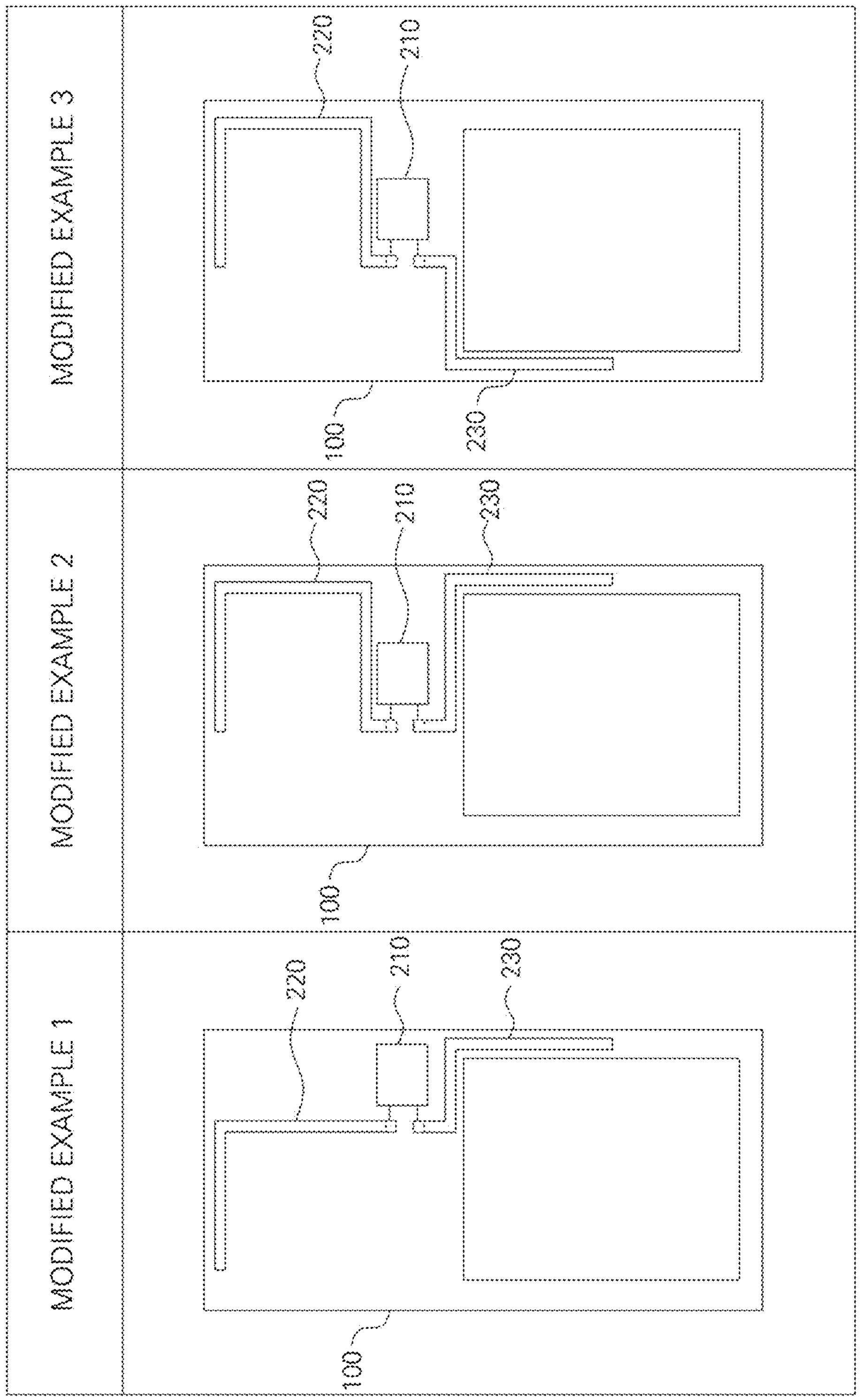

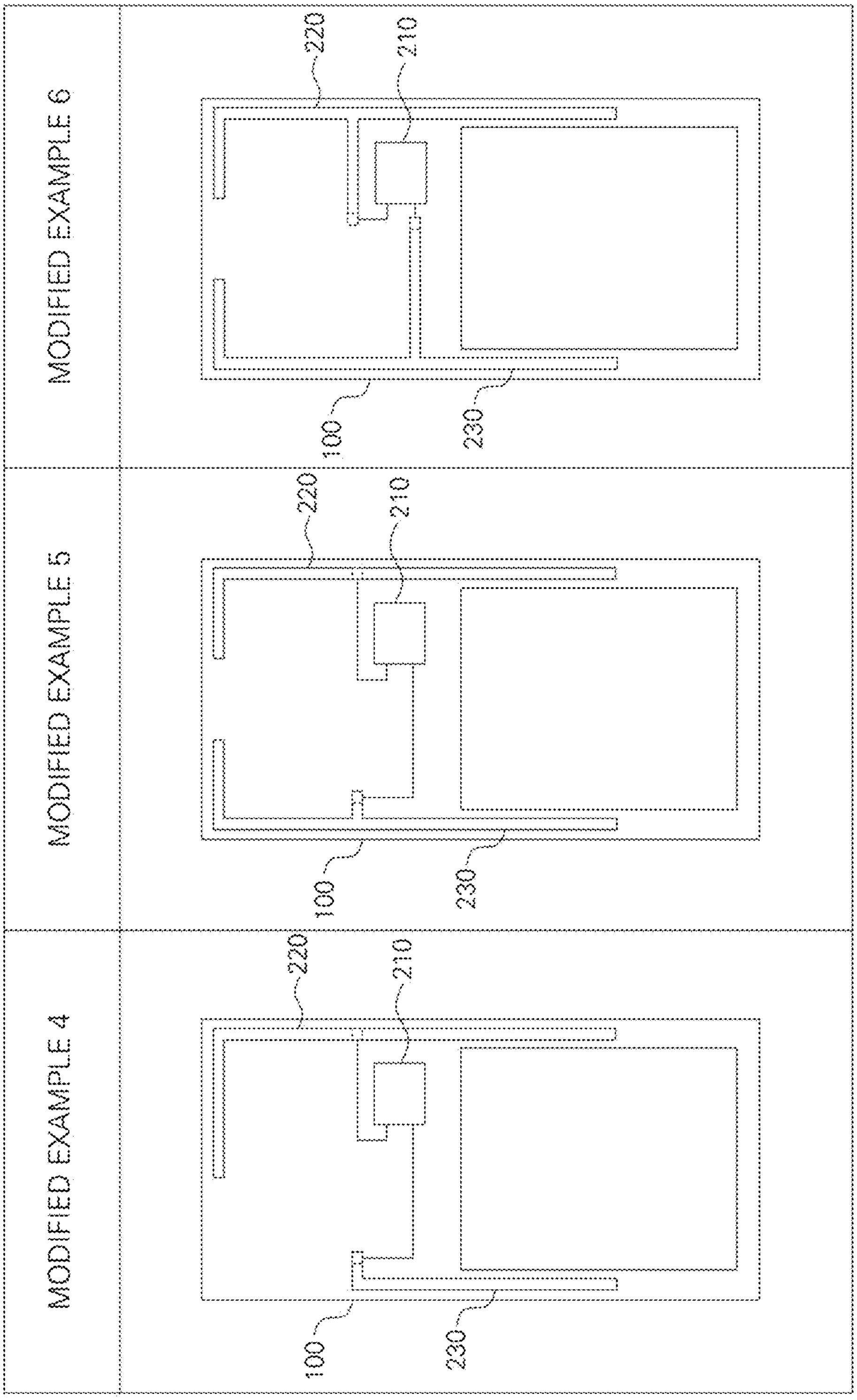
[FIG. 12]

[FIG. 13]
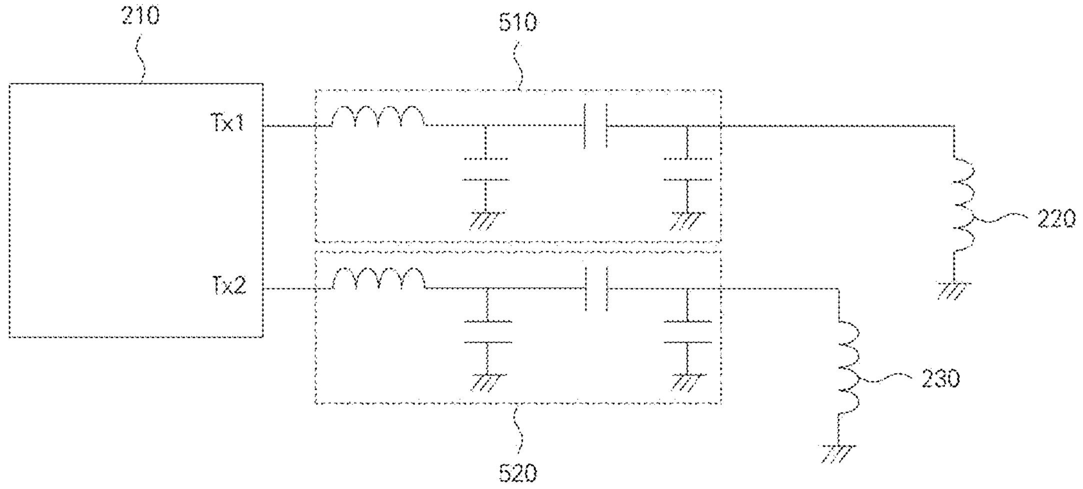

PORTABLE TERMINAL SUPPORTING SHORT-RANGE COMMUNICATION FROM TOP AND BACK

TECHNICAL FIELD

The present disclosure relates to a portable terminal that performs electronic payment, data transmission and reception, etc. through short-range communication.

BACKGROUND ART

Recently, the demand for electronic payment that pays for goods and services using a portable terminal has been increasing.

The electronic payment of a portable terminal includes a magnetic secure transmission (MST) method and a near field communication (NFC) method supported by Apple.

The MST method is an electronic payment method that transmits credit card information in a wireless manner to make a payment. The MST method has an advantage in that a magnetic payment terminal used for payment using a credit card can be used.

The NFC method is an electronic payment method of making a payment through short-range wireless communication between portable terminals. The NFC method has an advantage in that a portable terminal can function as a conventional credit card and payment terminal.

Since the conventional portable terminals have an antenna for electronic payment mounted on a back (i.e., a back of the portable terminal) of a board, there is a problem that users feel inconvenienced because payment is possible on only the back of the portable terminal.

Accordingly, manufacturers are developing portable terminals in which an antenna is disposed at one side (i.e., the top) of the portable terminal to enable electronic payment from the back and sides thereof.

The matters described above in the background art are intended to help understanding of the background of the disclosure and may include matters not related to the known related art.

SUMMARY OF INVENTION

Technical Problem

The present disclosure has been proposed considering such a point and is directed to providing a portable terminal in which two single ended antennas are each connected to one of a first transmission end and a second transmission end of an NFC chipset to enable short-range communication from the top and back of the portable terminal.

Solution to Problem

To achieve the above object, a portable terminal having a top and a back according to an embodiment of the present disclosure includes a near-field communication (NFC) having a first transmission end and a second transmission end, a first antenna connected to the first transmission end and having a region disposed parallel to a top of the portable terminal, and a second antenna connected to the second transmission end and having a loop disposed parallel to a back of the portable terminal.

The first antenna may be configured as a single ended antenna, a first end portion of the first antenna may be connected to the first transmission end, and a second end portion of the first antenna may be connected to a ground. In this case, the first antenna may have a region parallel to the top of the portable terminal between the first end portion and the second end portion of the first antenna.

The first antenna may include a first conductor having the first end portion connected to the ground and disposed parallel to the top of the portable terminal and a second conductor having the first end portion connected to the second end portion of the first conductor and having the second end portion connected to the first transmission end and have a "¬" shape bent in a region in which the first conductor and the second conductor are connected.

The first antenna may include a first conductor disposed parallel to the top of the portable terminal, a second conductor having the first end portion connected to the second end portion of the first conductor and having the second end portion connected to the first transmission end, and a third conductor having the first end portion connected to the first end portion of the first conductor and having the second end portion connected to the ground and have a "⊂" shape bent in a region in which the first conductor and the second conductor are connected and a region in which the first conductor and the third conductor are connected.

The second antenna may be configured as a single ended antenna, a first end portion of the second antenna may be connected to the second transmission end, a second end portion of the second antenna may be connected to the ground, and a loop parallel to the back of the portable terminal may be disposed between the first end portion and the second end portion of the second antenna.

The second antenna may have a loop shape that is disposed parallel to the back of the portable terminal and winds ½ times or more around a virtual winding axis orthogonal to the back of the portable terminal. The second antenna may have a loop shape that is disposed parallel to the back of the portable terminal and winds ½ times or more and twice or less around a virtual winding axis orthogonal to the back of the portable terminal.

The second antenna may have a loop shape that is disposed parallel to the back of the portable terminal and winds ½ times or more along a region in which a battery is disposed. The second antenna may have a loop shape that is disposed parallel to the back of the portable terminal and winds ½ times or more and twice or less along a region in which a battery is disposed.

Advantageous Effects of Invention

According to the present disclosure, since the portable terminal includes the first antenna having a part configured parallel to the top of the portable terminal and a second antenna having a loop shape parallel to the back of the portable terminal, it is possible to increase the recognition range of the NFC communication, thereby enabling short-range communication through the top and back of the portable terminal.

In addition, since the portable terminal has the two single ended antennas each connected to one of the first transmission end TX1 and the second transmission end TX2 of the NFC chipset, it is possible to minimize the manufacturing cost and the mounting space (design space) in comparison to the conventional portable terminal on which two NFC antennas are mounted.

In addition, since the portable terminal configures the NFC antenna using the single ended antenna to have a smaller area than the loop antenna, space utilization can be high, and the NFC antenna can be used as a combo with a wireless power charging (WPC), ultra-wide band (UWB) antenna, etc.

BRIEF DESCRIPTION OF DRAWINGS

FIG. 1 is a view for describing a portable terminal according to an embodiment of the present disclosure.

FIG. 2 is a view for describing a near-field communication (NFC) antenna module of FIG. 1.

FIGS. 3 to 6 are views for describing a first antenna of FIG. 2.

FIGS. 7 to 10 are views for describing a second antenna of FIG. 2.

FIGS. 11 and 12 are views for describing various modified examples of the first antenna and the second antenna of FIG. 2.

FIG. 13 is a view illustrating an equivalent circuit of the NFC antenna module of FIG. 1.

DESCRIPTION OF EMBODIMENTS

Hereinafter, exemplary embodiments according to the present disclosure will be described in detail with reference to the accompanying drawings.

The embodiments are provided to more completely describe the present disclosure to those skilled in the art, and the following embodiments may be modified in various different forms, and the scope of the present disclosure is limited to the following embodiments. Rather, the embodiments are provided to make the disclosure more faithful and complete and fully convey the spirit of the present disclosure.

Terms used herein are intended to describe specific embodiments and are not intended to limit the present disclosure. In addition, in the present specification, singular forms may include plural forms unless the context clearly indicates otherwise. In the description of embodiments, the top, bottom, left, and right are in principle based on the drawing.

The drawings are only intended to help understanding of the spirit of the present disclosure and should not be construed as limiting the scope of the present disclosure by the drawings. In addition, in the drawings, a relative thickness and length, or a relative size may be exaggerated for convenience and clarity of description.

Referring to FIG. 1, a portable terminal 100 according to an embodiment of the present disclosure includes a near-field communication (NFC) antenna module 200 disposed to enable short-range communication through a top 130 and a back 120. In this case, the NFC antenna module 200 includes an NFC chipset 210, a first antenna 220, and in a second antenna 230.

The portable terminal 100 according to the embodiment of the present disclosure is configured to make an electronic payment by transmitting and receiving an NFC signal through the first antenna 220 in a state in which the top 130 is disposed to face the top 130 (or the back 120) of another portable terminal 100.

In addition, the portable terminal 100 according to the embodiment of the present disclosure is configured to make an electronic payment by transmitting and receiving an NFC signal through the second antenna 230 in a state in which the back 120 is disposed to face the back 120 of another portable terminal 100.

The portable terminal 100 has, for example, a hexahedral shape including a front 110, the back 120, the top 130, a bottom 140, a left end 150, and a right end 160. In this case, the front 110 of the portable terminal 100 is a surface on which a display is disposed, and the back 120 of the portable terminal 100 is a surface on which a back housing is disposed.

The top 130 of the portable terminal 100 is a surface disposed adjacent to a camera among four surfaces of the portable terminal 100. The bottom 140 of the portable terminal 100 is a surface facing the top 130 among the four surfaces of the portable terminal 100. With respect to the back 120 of the portable terminal 100, the right end 160 of the portable terminal 100 is a surface disposed at the right side among the four surfaces of the portable terminal 100. With respect to the back 120 of the portable terminal 100, the left end 150 of the portable terminal 100 is a surface disposed at the left side among the four surfaces of the portable terminal 100.

Referring to FIG. 2, the NFC antenna module 200 includes an NFC chipset 210, a first antenna 220, and a second antenna 230. In this case, the NFC antenna module 200 is mounted inside the portable terminal 100 and is disposed between a main board of the portable terminal 100 and the back housing.

The first antenna 220 is configured as a single ended antenna and operates as a radiator for transmitting and receiving an NFC signal through the top 130 of the portable terminal 100. The first antenna 220 may be configured as a conductor and configured as a laser distance sensor (LDS) type, a flexible printed circuit board (FPCB) type, a metal frame, etc.

A first end portion of the first antenna 220 is connected to a first transmission end TX1 of the NFC chipset 210. The first end portion of the first antenna 220 may be connected to the first transmission end TX1 of the NFC chipset 210 through a plate-shaped first connection pad 212 connected to the first transmission end TX1 of the NFC chipset 210.

A second end portion of the first antenna 220 is connected to the ground GND. In this case, the second end portion of the first antenna 220 may be connected to the ground GND formed on the main board of the portable terminal 100 or a separately configured ground GND.

The first antenna 220 includes a first conductor 222 parallel to the top 130 of the portable terminal 100. Here, the first conductor 222 is a part of an upper conductor adjacent to the top 130 of the portable terminal 100 and is a region, which is disposed parallel to the top 130 of the portable terminal 100 in the drawing, of the upper conductor.

Referring to FIG. 3, the first antenna 220 has, for example, one bent portion and is formed in an "¬" shape that starts from the first transmission end TX1 of the NFC chipset 210, passes through the top 130 of the portable terminal 100, and is connected to the ground. To this end, the first antenna 220 includes the first conductor 222 and a second conductor 224.

The first conductor 222 is disposed parallel to the top 130 of the portable terminal 100. The first end portion of the first conductor 222 is connected to the ground GND. The second end portion of the first conductor 222 is connected to a first end portion of the second conductor 224.

The second conductor 224 may be disposed orthogonal to the first conductor 222 and disposed parallel to the right end 160 of the portable terminal 100 in the drawing. The first end portion of the second conductor 224 is connected to the second end portion of the first conductor 222. A second end portion of the second conductor 224 is connected to the first transmission end TX1 of the NFC chipset 210. In this case, the second conductor 224 may be connected to the first connection pad 212 connected to the first transmission end TX1 of the NFC chipset 210.

The first conductor 222 and the second conductor 224 may be disposed so that an angle therebetween forms a predetermined angle. That is, although FIG. 3 illustrates the first conductor 222 and the second conductor 224 that are orthogonal to each other, the present disclosure is not limited thereto, and the first conductor 222 and the second conductor 224 may be configured to have an angle that is less than 90 degrees or an angle greater than 90 degrees.

Referring to FIG. 4, the first antenna 220 has, as another example, two bent portions and is formed in an "⊂" shape that starts from the first transmission end TX1 of the NFC chipset 210, passes through the top 130 of the portable terminal 100, and is connected to the ground. To this end, the first antenna 220 includes the first conductor 222, the second conductor 224, and a third conductor 226.

The first conductor 222 is disposed parallel to the top 130 of the portable terminal 100. The first end portion of the first conductor 222 is connected to a first end portion of the third conductor 226. The second end portion of the first conductor 222 is connected to the first end portion of the second conductor 224.

The second conductor 224 may be disposed orthogonal to the first conductor 222 and disposed adjacent to the right end 160 of the portable terminal 100 in the drawing to be disposed parallel to the right end 160 of the portable terminal 100. The first end portion of the second conductor 224 is connected to the second end portion of the first conductor 222. The second end portion of the second conductor 224 is connected to the first transmission end TX1 of the NFC chipset 210. In this case, the second conductor 224 may be connected to the first connection pad 212 connected to the first transmission end TX1 of the NFC chipset 210.

The third conductor 226 may be disposed orthogonal to the first conductor 222 and disposed adjacent to the left end 150 of the portable terminal 100 in the drawing to be disposed parallel to the left end 150 of the portable terminal 100. The first end portion of the third conductor 226 is connected to the first end portion of the first conductor 222, and a second end portion of the third conductor 226 is connected to the ground GND.

An angle between the first conductor 222 and the second conductor 224 and the angle between the first conductor 222 and the third conductor 226 may be disposed to form a predetermined angle. That is, although FIG. 4 illustrates the first conductor 222 orthogonal to the second conductor 224 and the third conductor 226, the present disclosure is not limited thereto, and the first conductor 222 and the second conductor 224, and the first conductor 222 and the third conductor 226 may be formed to have an angle that is less than 90 degrees or an angle greater than 90 degrees.

Referring to FIGS. 5 and 6, the first antenna 220 may be modified in any of various forms depending on the position of the first transmission end TX1 of the NFC chipset 210 and the position of the NFC chipset 210. In this case, the first antenna 220 may be modified in any of various forms as long as it includes the first conductor 222 disposed parallel to the top 130 of the portable terminal 100. That is, the first antenna 220 may be modified in any of various forms as long as it passes through the top 130 of the portable terminal 100 starting from the first transmission end TX1 of the NFC chipset 210 and is connected to the ground.

The second antenna 230 is configured as a single ended antenna and operates as a radiator for transmitting and receiving an NFC signal through the back 120 of the portable terminal 100. The second antenna 230 may be configured as a conductor and configured as an LDS type, an FPCB type, a metal frame, etc.

The first end portion of the second antenna 230 is connected to a second transmission end TX2 of the NFC chipset 210. The second end portion of the second antenna 230 may be connected to the second transmission end TX2 of the NFC chipset 210 through a plate-shaped second connection pad 214 connected to the second transmission end TX2 of the NFC chipset 210.

The second end portion of the second antenna 230 is connected to the ground GND. In this case, the second end portion of the second antenna 230 may be connected to the ground GND formed on the main board of the portable terminal 100 or connected to a separately configured ground GND. In this case, the second end portion of the second antenna 230 may be connected to the ground GND connected to the second end portion of the first antenna 220 or connected to another ground GND.

Referring to FIG. 7, the second antenna 230 may be formed in a loop shape having the number of turns of one. The second antenna 230 may be formed in a loop shape that starts from the second transmission end TX2 of the NFC chipset 210 and winds once along a virtual winding axis orthogonal to the front 110 and the back 120 of the portable terminal 100. In this case, the second antenna 230 may form a loop that winds once along a region in which the battery 300 of the portable terminal 100 is disposed.

Referring to FIG. 8, the second antenna 230 may be formed in a loop shape having the number of turns of ½. The second antenna 230 may be formed in a loop shape that starts from the second transmission end TX2 of the NFC chipset 210 and winds ½ times along the virtual winding axis orthogonal to the front 110 and the back 120 of the portable terminal 100. In this case, the second antenna 230 may form a loop that winds ½ times along a region in which the battery 300 of the portable terminal 100 is disposed.

Referring to FIG. 9, the second antenna 230 may be formed in a loop shape having the number of turns of two. The second antenna 230 may be formed in a loop shape that starts from the second transmission end TX2 of the NFC chipset 210 and winds twice along a virtual winding axis orthogonal to the front 110 and the back 120 of the portable terminal 100. In this case, the second antenna 230 may form a loop that winds twice along a region in which the battery 300 of the portable terminal 100 is disposed. Here, the second antenna 230 may be disposed so that a part of the loop overlaps the battery 300.

As described above, the second antenna 230 may be formed in a loop shape that starts from the second transmission end TX2 of the NFC chipset 210 and winds ½ or more times along the virtual winding axis orthogonal to the front 110 and the back 120 of the portable terminal 100. The loop formed by the second antenna 230 is disposed parallel to the back 120 of the portable terminal 100.

In this case, when the second antenna 230 is formed in a loop shape having the number of turns less than ½, a null region in which NFC communication is not established occurs.

Accordingly, the second antenna 230 may be formed in a loop shape that starts from the second transmission end TX2 of the NFC chipset 210 and winds ½ or more times along the virtual winding axis orthogonal to the front 110 and the back 120 of the portable terminal 100.

Referring to FIG. 10, the second antenna 230 may be formed integrally with a combo antenna 400 on which a WPC, a UWB, etc. are formed. Here, the second antenna 230 may be disposed on the same board as a WPC radiation pattern and a UWB radiation pattern or disposed on the coverlay of the board on which the WPC radiation pattern and the UWB radiation pattern are formed and formed integrally with the combo antenna 400.

Referring to FIGS. 11 and 12, an area, shape, etc. of a mounting space of the portable terminal 100 on which the antenna may be mounted may vary depending on a manufacturer and a product. Accordingly, the first antenna 220 and the second antenna 230 may be modified into various forms according to the mounting space of the portable terminal 100.

The portable terminal 100 of modified examples 1 to 3 illustrated in FIG. 11 has a structure in which the first antenna 220 performs short-range communication at the top 130 of the portable terminal 100 and the second antenna 230 performs short-range communication at the back 120 of the portable terminal 100 in the same manner as in the above-described embodiment.

Since the first antenna 220 includes the first conductor 222 adjacent to the top 130 of the portable terminal 100, short-range communication at the same level as the above-described embodiment is possible at the top 130 of the portable terminal 100.

Since the second antenna 230 is formed with the number of turns less than ½ times, short-range communication performance at the back 120 of the portable terminal 100 is poor in comparison to the above-described embodiment, but short-range communication is possible at the back 120.

The portable terminal 100 of modified examples 4 to 6 illustrated in FIG. 12 has a structure in which the second conductor 224 of the first antenna 220 extends to the region in which the battery 300 is disposed, and the short-range communication performance at the back 120 is improved in comparison to the portable terminal 100 of the above-described modified examples 1 to 3.

The portable terminal 100 of the modified examples 5 and 6 may be formed so that the second antenna 230 has a region parallel to the top 130 of the portable terminal 100, and the portable terminal 100 may be configured to perform short-range communication by driving the first antenna 220 or the second antenna 230 depending on the position of another portable terminal 100.

When another portable terminal 100 is positioned at the left top 130 or a left side in the drawing, the portable terminal 100 performs short-range communication with another portable terminal 100 through the second antenna 230. When another portable terminal 100 is positioned at the right top 130 or a right side of the drawing, the portable terminal 100 performs short-range communication with another portable terminal 100 through the first antenna 220.

When another portable terminal 100 is positioned to be biased to the right (in the drawing) from the back 120 of the portable terminal 100, the portable terminal 100 performs short-range communication with another portable terminal 100 through the first antenna 220. When another portable terminal 100 is positioned to be biased to the left (in the drawing) from the back 120 of the portable terminal 100, the portable terminal 100 performs short-range communication with another portable terminal 100 through the second antenna 230.

Referring to FIG. 13, the NFC antenna module 200 used in the portable terminal 100 according to the embodiment of the present disclosure has the first antenna 220, which is a single-ended antenna, connected to the first transmission end TX1 of the NFC chipset 210 and the second antenna 230, which is a single-ended antenna, connected to the second transmission end TX2 of the NFC chipset 210.

The NFC antenna module 200 may further include matching circuits 510 and 520 composed of a resistor, a capacitor, etc., and the matching circuits 510 and 520 may be connected between the first transmission end TX1 of the NFC chipset 210 and the first antenna 220 and between the second transmission end TX2 of the NFC chipset 210 and the second antenna 230, respectively.

As described above, the portable terminal 100 according to the embodiment of the present disclosure includes the first antenna 220 configured parallel to the top 130 of the portable terminal 100 and the second antenna 230 in a loop shape parallel to the back 120 of the portable terminal 100, thereby increasing the recognition range of the NFC communication and enabling electronic payment through the top 130 and the back 120 of the portable terminal 100.

In addition, the portable terminal 100 according to the embodiment of the present disclosure has two antennas configured as a single-ended antenna each connected to one of the first transmission end TX1 and the second transmission end TX2 of the NFC chipset 210, thereby minimizing the manufacturing cost and the mounting space (the design space) in comparison to the conventional portable terminal 100 having two NFC antennas.

In addition, the portable terminal 100 according to the embodiment of the present disclosure can configure the NFC antenna as a single-ended antenna to have a smaller area than the loop antenna, and thus increase space utilization and can be used as a combo with WPC, UWB antennas, etc.

The above description is merely the exemplary description of the technical spirit of the present disclosure, and those skilled in the art to which the present disclosure pertains will be able to variously modify and change the present disclosure without departing from the essential characteristics of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed by the appended claims, and all technical ideas within the equivalent scope should be construed as being included in the scope of the present disclosure.

The invention claimed is:

1. A portable terminal having a top and a back, comprising:
- a near-field communication (NFC) chipset having a first transmission end and a second transmission end;
- a first antenna connected to the first transmission end and having a region disposed parallel to the top of the portable terminal; and
- a second antenna connected to the second transmission end and having a loop disposed parallel to the back of the portable terminal,
- wherein a first end portion of the first antenna is connected to the first transmission end, and a second end portion of the first antenna is connected to a ground, and
- wherein a first end portion of the second antenna is connected to the second transmission end, and a second end portion of the second antenna is connected to the ground.

2. The portable terminal of claim 1, wherein the first antenna is configured as a single ended antenna.

3. The portable terminal of claim 1, wherein the first antenna has a region parallel to the top of the portable terminal between the first end portion and the second end portion of the first antenna.

4. The portable terminal of claim 1, wherein the first antenna includes:

a first conductor having a first end portion connected to the ground and disposed parallel to the top of the portable terminal; and a second conductor having a first end portion connected to the second end portion of the first conductor and having a second end portion connected to the first transmission end.

5. The portable terminal of claim 4, wherein the first antenna has a "L" shape bent in a region in which the first conductor and the second conductor are connected.

6. The portable terminal of claim 1, wherein the first antenna includes:

a first conductor disposed parallel to the top of the portable terminal;

a second conductor having the first end portion connected to the second end portion of the first conductor and having the second end portion connected to the first transmission end; and a third conductor having the first end portion connected to the first end portion of the first conductor and having the second end portion connected to the ground.

7. The portable terminal of claim 6, wherein the first antenna has a "C" shape bent in a region in which the first conductor and the second conductor are connected and a region in which the first conductor and the third conductor are connected.

8. The portable terminal of claim 1, wherein the second antenna is configured as a single ended antenna, and the loop parallel to the back of the portable terminal is disposed between the first end portion and the second end portion of the second antenna.

9. The portable terminal of claim 1, wherein the second antenna has a loop shape that is disposed parallel to the back of the portable terminal and winds ½ times or more around a virtual winding axis orthogonal to the back of the portable terminal.

10. The portable terminal of claim 1, wherein the second antenna has a loop shape that is disposed parallel to the back of the portable terminal and winds ½ times or more and twice or less around a virtual winding axis orthogonal to the back of the portable terminal.

11. The portable terminal of claim 1, wherein the second antenna has a loop shape that is disposed parallel to the back of the portable terminal and winds ½ times or more along a region in which a battery is disposed.

12. The portable terminal of claim 1, wherein the second antenna has a loop shape that is disposed parallel to the back of the portable terminal and winds ½ times or more and twice or less along a region in which a battery is disposed.

* * * * *